United States Patent [19]

Moore

[11] Patent Number: 5,168,447
[45] Date of Patent: Dec. 1, 1992

[54] ENGINE TRIM CONTROL UNIT

[75] Inventor: Leland E. Moore, Snohomish, Wash.

[73] Assignee: The Boeing Company, Seattle, Wash.

[21] Appl. No.: 847,493

[22] Filed: Apr. 2, 1986

Related U.S. Application Data

[63] Continuation of Ser. No. 565,980, Dec. 27, 1983, abandoned.

[51] Int. Cl.$^5$ .................... G05G 23/00; G06F 15/20; G01M 15/00
[52] U.S. Cl. ............... 364/431.01; 73/117.3
[58] Field of Search ............ 364/431.01, 431.02, 364/551; 60/39.281, 39.15, 39.27, 39.29; 73/116, 117.3

[56] References Cited

U.S. PATENT DOCUMENTS

| | | | |
|---|---|---|---|
| 3,590,653 | 7/1971 | Dreckmann et al. | 60/39.27 |
| 3,648,033 | 3/1971 | Bader | 364/431.02 |
| 3,813,063 | 5/1974 | Martin | 60/39.281 |
| 3,839,860 | 10/1974 | Martin | 60/39.15 |
| 3,852,956 | 12/1974 | Martin | 60/39.281 |
| 3,882,305 | 5/1975 | Johnstone | 364/551 |
| 3,953,968 | 5/1976 | Jurisch | 60/39.281 |
| 4,056,732 | 11/1977 | Martin | 307/33 |
| 4,116,052 | 9/1978 | Paluka | 73/117.3 |
| 4,158,884 | 6/1979 | McKinley et al. | 364/551 |
| 4,300,205 | 11/1981 | Tansuwan | 364/431.01 |

FOREIGN PATENT DOCUMENTS 58-216929 12/1983 Japan ..................... 364/431.01

*Primary Examiner*—Felix D. Gruber
*Attorney, Agent, or Firm*—Hughes & Multer

[57] ABSTRACT

An engine trim control unit for monitoring the operational characteristics of one or more gas turbine engines on an aircraft from the cockpit thereof and sequentially adjusting selected ones of a plurality of engine parameters for the engines from the cockpit is comprised of a controller (10) incorporating digital microcircuitry and interfacing with engine-side components via a multiplexer (12); tranducers for generating signals representative of the condition of at least one structurally variable engine component indicative of (i) variable stator vane position (14) and (ii) engine compressor airflow bleed (16); and wherein the multiplexer selectively routes trim command signals to remotely actuable trim head members in operative engagement with engine-mounted trim screws for selectively adjusting at least one variable engine parameter including (i) engine vane and bleed control (70), (ii) engine compressor airflow bleed (72), (iii) approach idle (82), (iv) minimum idle (84) and (v) takeoff power (72), and a remotely operable actuator member (64) for establishing part power position of the fuel control unit of the engine during the trimming operation.

5 Claims, 4 Drawing Sheets

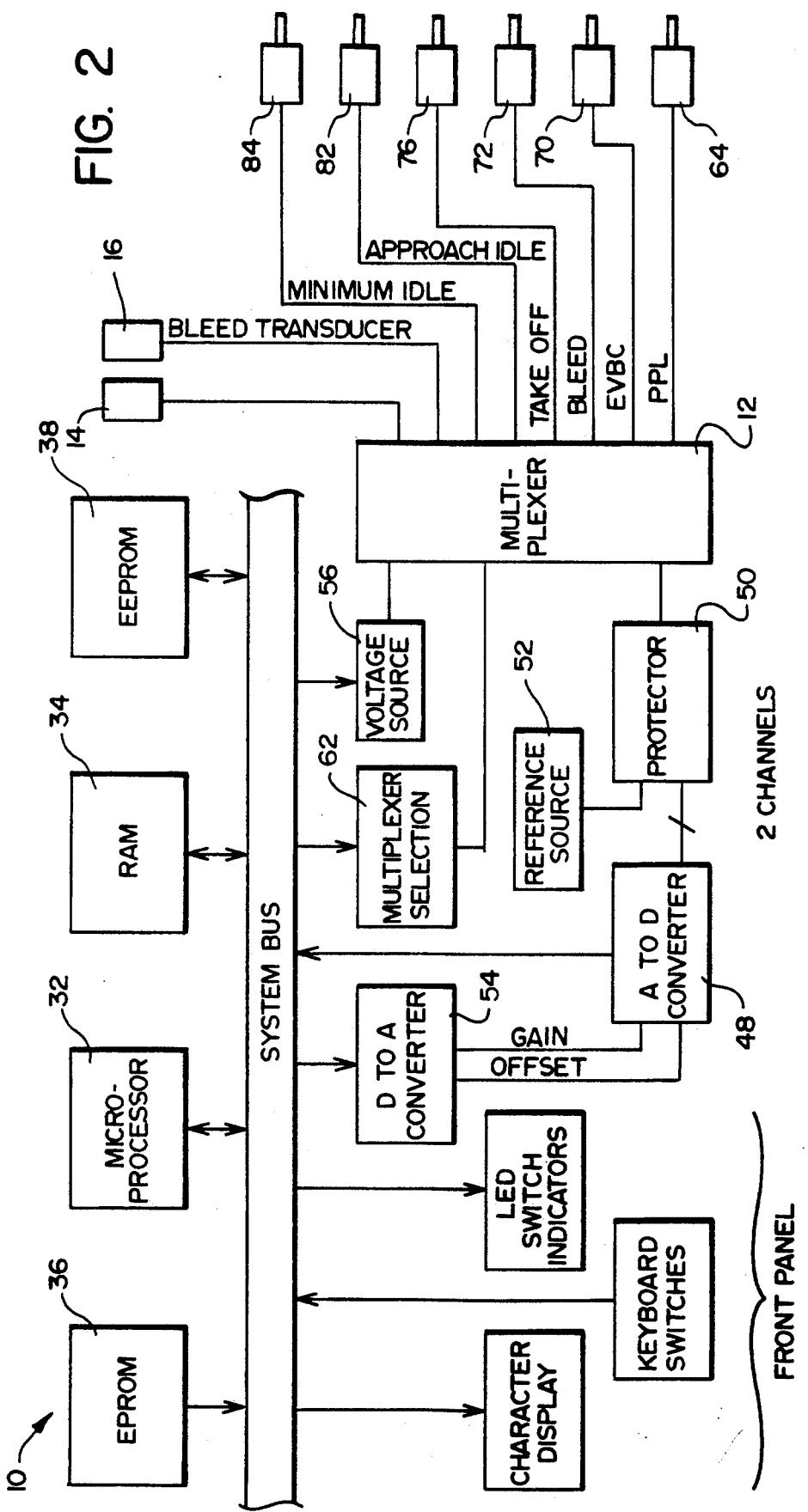

ENGINE TRIM CONTROL UNIT

This is a continuation of application Ser. No. 565,980 filed Dec. 27, 1983, now abandoned.

TECHNICAL FIELD

The present invention relates generally to trim control units for monitoring the performance characteristics of and adjusting aircraft jet engines; and, more especially, the invention concerns portable engine trim control units which facilitate remote trim operations to be undertaken from the cockpit area of the craft. The engine trim control unit of the present invention is particularly adapted for electrical communication with the engine via remotely actuable trim heads and suitable sensors borne under the engine cowling, in order to receive data on extant engine conditions and permit remote trimming of desirable engine parameters from within the cockpit.

DESCRIPTION OF THE BACKGROUND ART

Jet engines employed in modern aircraft require careful control over operational characteristics for optimum performance. Multiengine craft also require a balancing of engine performance so that, for example, the engines operate similarly when at a common throttle setting. This calibration of engine parameters, dubbed "trimming" by those skilled in the art, occurs following manufacture of the aircraft and then periodically over its service life, usually about every 200 operating hours.

Typically, the aircraft engines of interest are dual spool engines having non-mechanically linked low pressure compressor and high pressure compressor stages. Variable stator vanes in the compressors modulate combustion air in response to the flight regime of the craft, with the high pressure compressor usually being of greater interest in this regard; coordinating air availability with fuel for that purpose. A fairly complex hydromechanical linkage provides the requisite level of control. Engine speed must also be coordinated with these same thoughts in mind. Components in this overall assembly responsible for fuel control, both directly and indirectly, are those which must be trimmed to balance properly the diverse engine conditions existing throughout flight. The parameters requiring trim vary with regard to engine model and manufacturer; but, in virtually all cases, one or more of the following engine parameters require periodic adjustment for optimal engine operation: (i) engine vane and bleed control, (ii) intercompressor airflow bleed (sometimes referred to as "station 3.0 bleed"), (iii) approach idle, (iv) minimum idle, (v) takeoff power.

A number of different approaches have been adopted over the years to trim these aircraft engine parameters. One of the earliest techniques required quite a number of ground personnel, some of whom would work outside the craft and at least one of whom would be placed in the cockpit in order to inspect gauges and the like for monitoring pertinent engine conditions. Insofar as cockpit instrumentation typically does not include gauges which are dedicated to each of the required engine parameters of interest, ancillary equipment would be needed at the engine location. Readings would be taken with the engine or engines at a predetermined power level; manufacturer's charts would be consulted to determine the type and extent of necessary correction; the engine would be shut down; and the correction would then be made on an ad hoc basis. That procedure would be followed repetitively until each parameter had been successfully trimmed through this laborious technique. The approach was a very tedious one, insofar as the actual adjustment of a trim screw borne upon the aircraft engine required the engine to be shut down, the cowling opened and the technician to estimate how far the trim screw ought to be turned to achieve the desired result; that followed by repositioning of the cowling, restarting the engine, and rereading the instrumentation. To a certain extent manufacturer's specifications assisted this technique, inasmuch as each trim screw was associated with a collar or the like having indentations disposed equiangularly thereabout in order that a complete revolution of the screw was divided into a number of "clicks". Manufacturer'specifications were geared to movement of the trim screw over a predetermined number of "clicks" as determined by the indentations to achieve a desired amount of adjustment. Still, the procedure was highly labor intensive, consuming many man-hours of time to achieve proper trim of an engine.

Later, this ad hoc approach gave way to a slight improvement which eliminated at least the need to open and close the engine cowling repetitively. Flexible drive members associated with a trim head were removably installed on the engine in advance of a trimming operation. The flexible drives were disposed to cooperate with a respective engine trim screw to turn the same, terminating at a location outside the cowling allowing an operator to make adjustments from that exterior position. In a related approach, a gear box disposed externally of the cowling provided electromechanical linkage between the flex-drive cables and an operator in the cockpit. However, even these approaches, while improvements, suffered problems nonetheless. Most notably, the hysteresis of flexible drives made their use awkward and sometimes unreliable (i.e., due to windup and backlash associated with several feet of flex-drive cables), regardless of direct or indirect manipulation at or near the engine.

No truly efficient and virtually foolproof method of effectuating remote engine trim has yet to be devised. However, certain patented systems have been suggested in the past for various types of other engine control and warrant brief mention for background purposes.

U.S. Pat. Nos. 4,158,884 and 4,116,052 are generally representative of engine trim test sets; each providing means to examine into the engine parameters requiring trim adjustment but not with the collateral ability to undertake necessary trim. Viewing the '884 reference as representative, the device therein disclosed is a portable test set for taking field measurements of the engine conditions of interest and inputting data representative thereof to a microprocessor. The microprocessor uses these input signals, along with stored data, to calculate values for measured trim parameters and outputs that result to a digital display for operator observation.

Of some incidental interest along conceptually related lines, U.S. Pat. No. 4,056,732 discloses an airborne electronic engine control system. This is flight, as opposed to ground, equipment designed to regulate the AC electrical power provided by an engine driven alternator, all with an eye toward controlling the performance of a gas turbine engine. But, the ability to achieve remote trim remains beyond the intended scope of that device.

Considering the fact that the present engine trim control unit employs remotely actuable drive members for effectuating trim commands, other patented systems come to the fore in terms of background. Among these are included U.S. Pat. Nos. 3,813,063, 3,839,860, and 3,852,956. Each of these references concerns an automatic aircraft engine pressure ratio ("EPR") control system. These systems deal with EPR equalization for gas turbine engines and/or automatic thrust management which are permanent parts of the engine installation in the airplane and are used in day-to-day flight operation. These types of trim systems are quite different from the engine trim control units employed to monitor an engine, either at the time of initial aircraft fabrication or as part of a routine, periodic maintenance schedule, and thence to trim engine parameters; whereupon the trim unit and ancillary equipment are stripped from the craft and its engine.

SUMMARY OF THE INVENTION

The present invention advantageously provides a portable engine trim control unit for remotely trimming adjustable parameters of an aircraft gas turbine engine and, more particularly, a turbo-fan-type jet engine, either on the aircraft or in a test chamber. The present engine trim control unit desirably provides remote trim control of at least one of the generally conventional engine parameters for (i) engine vane and bleed control, (ii) intercompressor airflow bleed (or intercompressor airflow diversion), (iii) approach idle, (iv) minimum idle and (v) takeoff power. These parameters are operated upon remotely, as is engine part power lock, permitting both monitoring and adjusting engine parameters from within the cockpit of an aircraft. The portable engine trim control unit of the present invention provides yet the further advantage of yielding a trim control apparatus which is highly mobile allowing the same to be brought to aircraft under emergency conditions. Still a further benefit of the present invention is its ability to be integrated within or otherwise utilized in trimming any commercial aircraft due to its ready adaptability to virtually any type of aircraft. The engine trim control unit of the present invention is further remarkable for its ability to foster routine trimming of engines more easily and more reliably than previous approaches; saving many hours of tedious trimming while enhancing the confidence level in the trim operation.

The foregoing, and other, advantages of the present invention are realized in one aspect thereof by a portable engine trim control unit for remotely monitoring the operational characteristics of a plurality of jet engines (i.e., gas turbine engines) from the cockpit area of an aircraft (preferably a multiengine craft) and sequentially adjusting desirable ones of the engine parameters for each of such engines also from the cockpit; which engine trim control unit comprises a controller means, including microprocessor means for receiving data indicative of one or more desirable engine parameters, processing that data, receiving trim instruction signals, and generating trim signals as a function thereof; transducer means for operative engagement with at least one structurally variable engine component determinative of engine vane positioning and/or intercompressor airflow bleed and external division, and for generating real time signal outputs indicative of the position of the desired component; remotely operable trim head means for operative engagement with engine-mounted trim screw means for adjusting at least one of the engine parameters of interest; remotely operable actuator means for operative engagement with, and for inserting and retracting, a part power lock pin for physical interruption of the path of travel of fuel control lever means for the aircraft engine being trimmed; and multiplexer means disposed in intermediate electrical communication with the controller means and the transducer means, trim head and actuator, for selectively routing engine data and trim command signals. The engine trim control unit of the present invention is capable of trimming at least one and preferably all of the engine parameters respecting (i) engine vane and bleed control, (ii) compressor airflow bleed, (iii) approach idle, (iv) minimum idle and (v) takeoff power. For this purpose, the transducer means preferably constitute signal-generating members in operative engagement with structurally variable engine components which are either indicative or determinative of (i) variable stator vane positioning and (ii) intercompressor airflow bleed and external diversion, for the purpose of developing signals representative of those engine parameters. The remaining engine parameters are most conveniently monitored via conventional cockpit instrumentation; albeit suitable additional transducers may be engine mounted should that be necessary or desirable.

The portable trim control unit of the present invention most preferably includes means for interrogating selective ones of the transducer members and for generating selective specific trim control signals for application to the remotely operable trim head means. Preferably, those trim head means are comprised of a trim head unit operated by a miniature DC motor, most preferably a rare earth-cobalt, brushless DC motor such as a samarium cobalt motor, for direct drive of the engine mounted trim screw via a planetary gear assembly of the trim head.

The controller means of the engine trim control unit of the present invention is most preferably comprised of a microprocessor for operating upon data inputted to the unit from the engine-mounted hardware and data stored in the controller itself, most preferably in erasable PROMS (i.e., EPROMS and EEPROMS). In this manner, calibration data may be inputted to account for the specific vagaries of a particular engine while ambient weather conditions may similarly be factored into trimming calculations. Procedures for different engine models may likewise be stored in order that the range of adaptability of the present unit may be expanded. An operator with the controller unit in the cockpit area of the craft may initiate the trim procedure for the specific engines of interest and given the particular ambient conditions, calibrate the device, and thence trim one or more of the aforementioned engine parameters and preferably all of same as may be required in accordance with the manufacturer's specifications.

Other advantages, and a fuller appreciation of the construction and mode of operation of the present invention will be gained upon an examination of the following detailed description of preferred embodiments, taken in conjunction with the figures of drawing.

BRIEF DESCRIPTION OF THE DRAWINGS

FIG. 2 is a partially schematic, simplified block diagram of an engine trim control unit in accordance with the present invention, shown to possess the capability of trimming one or more engine parameters in respect of engine vane and bleed control, intercompressor airflow bleed, approch idle, minimum idle, and takeoff power, with the further ability to make adjustments at part power levels for the engine of interest; and, FIG. 3 is a simplified flow diagram for the engine trim control unit of FIG. 2, showing in FIG. 3A calibration logic and in FIG. 3B operation logic.

DETAILED DESCRIPTION

Figure 1:
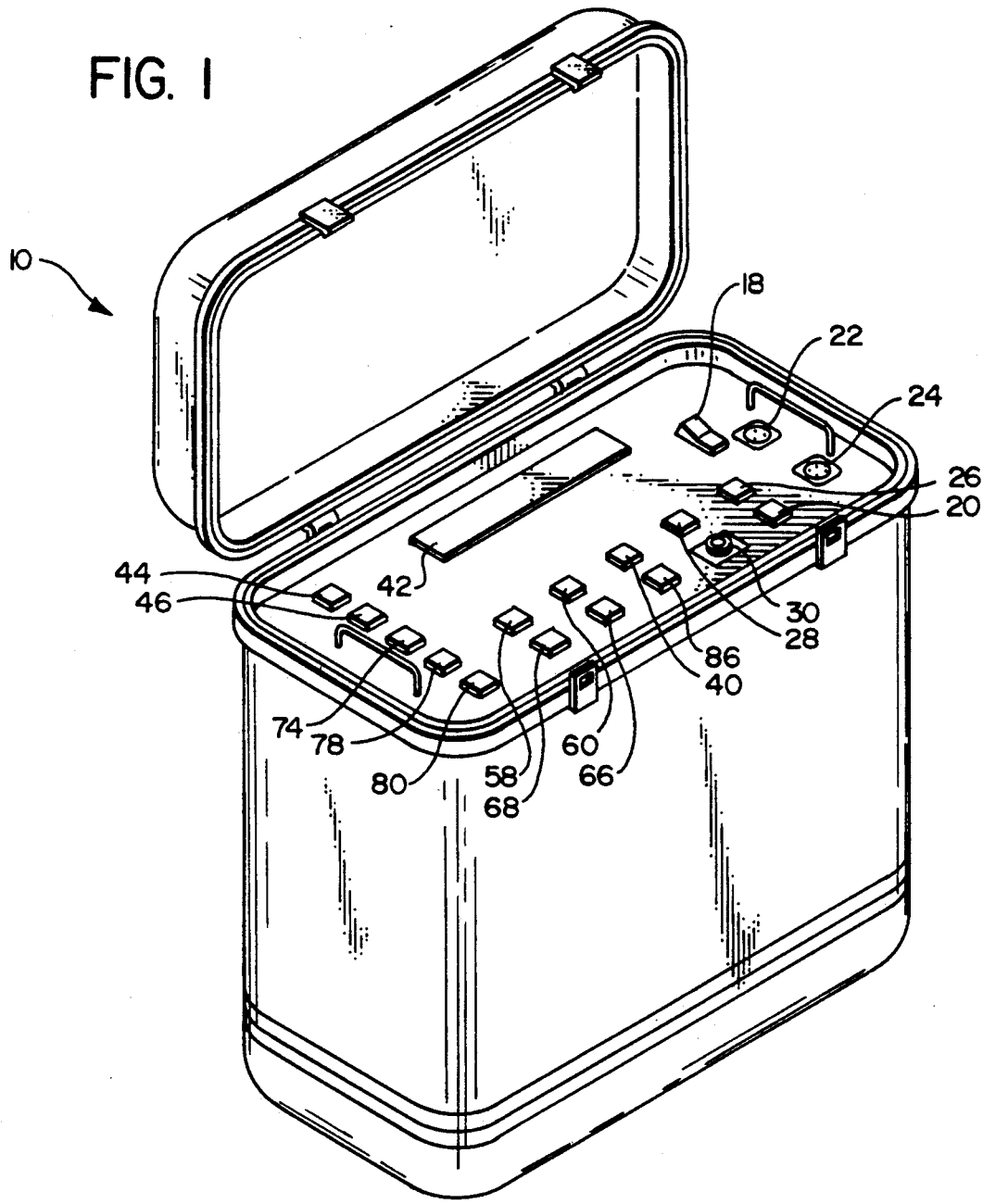
FIG. 1 is an isometric view of one suitable physical implementation of the controller member of the engine trim control unit of the present invention which is most preferably operated from within the cockpit of the aircraft, communicating with the engine(s) to be trimmed via the electrical harness of the craft.

The present invention relates generally to trim control units for monitoring and adjusting the performance of aircraft jet engines and, more especially, to portable engine trim control units which facilitate trim operations to be undertaken from the cockpit area of the craft. The engine trim control unit of the present invention is particularly adapted for electrical communication with the engine via remotely actuable trim heads borne under the engine cowling, to receive data on extant engine conditions and permit remote trimming of desirable engine parameters from within the cockpit. Accordingly, the present invention will now be described with reference to certain preferred embodiments within the aforementioned contexts; albeit, those skilled in the art will appreciate that such a description is meant to be exemplary and should not be deemed limitative.

Modern aircraft gas turbine engines are now conventionally dual spool engines having mechanically non-linked high and low pressure compressors. The compressors almost uniformly include variable stator vanes in order to alter the pitch of the vanes or intervane spacing which, in turn, controls the flow delivered to the rotors (i.e., "buckets"). All of this variation in vane manipulation is made with an eye toward matching the performance of the engine to the flight regime for, amongst other reasons, providing modulated thrust characteristics to account for the different demands during takeoff, cruise, and other routine flight situations. Thus, variable stator vane positioning must ultimately be responsive to the demands imposed on the craft by the pilot via the aircraft throttle(s). Coordination of the position of variable stator vanes with the throttle must be achieved not only with respect to a given engine, but among engines on a multiengine craft. This constitutes one aspect of periodic trimming which must be undertaken to maintain the craft flightworthy.

These aforementioned variations in airflow through a dual spool engine also influence the stall characteristics thereof. For example, under certain routine circumstances the airflow through the low pressure compressor exceeds that which can be accommodated by the high pressure compressor of the engine, each operating at different rotational speeds. More specifically, at low power settings the low pressure compressor will pump more air than the high pressure compressor can accommodate; this excess air must be rerouted and, most conveniently, simply by dumping same overboard through a bleed valve. At higher power settings (e.g., above 85% of the high pressure compressor), all of the first stage compressed flow can be utilized and the bleed valve will move to a closed position to cover bleed ports theretofore routing the excess air externally of the engine. In this situation all of the low pressure compressor air is now received by the high pressure compressor with the bleed valve maintaining airflow balance between the two. The bleed valve is itself controlled by various hydromechanical linkages so that, for example, during a rapid retarding of the thrust lever an override signal will cause the valve to open during correlative rapid deceleration; since the high pressure compressor will slow down faster than the low pressure compressor, which otherwise would pump more air than could be accommodated at the downstream side and, thus, create a stall situation on the low pressure compressor. This too is an engine operating parameter which must be trimmed periodically to maintain the engine at peak operating efficiency.

Engine idle (measured in rpms) is another operating parameter of considerable interest in terms of engine performance and efficiencies, and with respect to both low pressure and high pressure compressors (oftentimes referred to as "N1" and "N2", respectively). In this context, minimum idle is an adjustment requiring periodic attention as is engine idle under approach conditions (i.e., "approach idle"). Related in a general sense is takeoff, i.e., the operating speed of the engine at the thrust required for takeoff. Further along these latter lines, the time span between minimum idle conditions and takeoff power conditions is an important parameter demanding periodic monitoring with an eye toward making suitable corrective adjustment to the engine to maintain that time period with manufacturer's specifications.

The central component of the aircraft gas turbine engine is a fuel control unit which, as the name aptly implies, meters fuel to the combustion zone of the turbine at a rate governed by the demands on the engine. Much of the periodic trimming operation performed on an engine is made with an eye toward controlling either directly or indirectly the performance characteristics of the fuel control unit at various power settings as measured physically by a so-called power lever angle. Thus, certain measurements are taken at precise power lever settings or partial power positions, commonly dubbed "part power." And, not only must a given fuel control unit be determined to be operating within the specific tolerances established by the engine manufacturer, fuel control units as between or among several engines on a multiengine craft must be reasonably coordinated so that throttle levers within the cockpit are not staggered significantly in order to have different engines operating at similar performance levels. Accordingly, it is not enough that a given fuel control unit be ultimately determined within manufacturer's allowable tolerance ranges; all fuel control units on a given craft must exhibit generally parallel performance as ascertained by a trimming operation to maintain comparable throttle lever spacing. Otherwise, one or more fuel control units must be replaced.

With the foregoing objectives in mind, the present engine trim control unit provides a simple and expedient device and method for monitoring one or more of the foregoing engine parameters (or another analogous parameter should that be of interest) and thence for the remote trim of the engine. The instant engine trim control unit is most preferably configured for operation from within the cockpit area of the craft requiring ground personnel for but a very limited role in minor physical manipulation of the engine during the calibration stage as opposed to the current techniques requiring more significant involvement. Hard wiring through the craft harness to the engines is the most preferred manner of communication between the cockpit-side and engine-side components of the system; however, for existing craft, very simple cables may be deployed for this purpose.

Engine performance is very closely associated with, while trim procedures are critically influenced by, ambient conditions. Accordingly, all trim operations must be normalized to take into account vagaries in such weather conditions as temperature, humidity, barometric pressure, wind velocity and direction, to name those of most importance. Indeed, to underscore the importance of weather, the effects these ambient conditions create can be enough to render a given trim operation a nullity. For example, ultimate trim must be achieved within 0.01 "EPR" units (i.e., engine pressure ratio units), but wind can effect a change EPR by 0.02—twice the maximum allowable tolerance for the overall procedure. Hence, the importance of weather on trim. This has two connotations in respect of the present invention; viz., the system optionally but advantageously dedicates memory containing weather normalizing data while engine calibration data is also stored in the event a given trim operation must be interrupted on account, for example, of erratic wind or other weather variations.

Another aspect of the present invention of important overall consideration is the ability to trim an engine from a remote location, preferably from the cockpit area of the craft. This is facilitated, in one aspect of the present invention, by the use of miniature direct current motors installed on the engine to be trimmed for purposes of the procedure. The preferred motors are rare earth cobalt, brushless motors which are available commercially from various sources (e.g., EMI of San Gabriel, Calif.) in very small size (on the order of $\frac{3}{4}$" by 1") and yet which are capable of being geared down to a relatively slow output rotation (on the order of 1 rpm) with substantial output torque for the size (on the order of about ten inch-pounds). The most preferred motors along these lines are samarium cobalt motors having the foregoing performance characteristics. In this way the operator may command a motor to turn one way or another for a required number of revolutions, or a portion thereof, and thereby control a trim screw for the purpose of adjusting a desired engine parameter. Furthermore, the motors of the present invention utilized to affect trim adjustments most preferably include a microswitch which is set to open and close at a rate of, for example, 36 times per revolution. Insofar as engine technicians are accustomed to adjusting a trim screw a given number of "clicks" in a given direction in response to most manufacturers' specifications, the microswitch replicates that "clicking" feature in order to maintain the operator's general familiarity with a trimming procedure and extrapolate the clicking feature to the improved technique of the present invention. Additionally, it also provides a positive indication that the trim motor is indeed turning in response to commands initiated from the cockpit by the operator, an important indication wholly apart from the aforenoted benefit of operator familiarity.

The operator prepares for a trimming operation by installation of transducer means on the engine to obtain signals indicative of at least one engine condition in respect of (i) engine vane and bleed control and (ii) intercompressor airflow bleed and external diversion. These are engine parameters which do not appear on normal cockpit instrumentation and, accordingly, require the generation of such signals for presentation to the operator. Likewise, trim heads must be installed on the engine in operative association with trim screws in advance of the trimming procedure in order to make the requisite adjustments in desired engine parameters. Along these lines, a preferred technique as a matter of expediency is to employ conventional trim heads available in the marketplace (such as those marketed by Compair, Inc. of Los Angeles, Calif.) which incorporate the flexible drives discussed above, remove those flexible cable drives and replace the same with a motor such as the samarium cobalt motor discussed above; and thence provide electrical communication between that motor and the remote controller unit employed by the operator for the trimming procedure. Regardless, trim heads are associated with each adjustable trim screw corresponding to each of a series of engine parameters to be adjusted including at least one of (i) engine vane and bleed control, (ii) intercompressor airflow bleed and external diversion, (iii) approach idle, (iv) minimum idle and (v) takeoff power. Furthermore, in order to make adjustments at various incremental power positions, a further actuator means, preferably the same type of DC, brushless motor used for trimming, is disposed in operative engagement with the "part power pin" of the engine in order to insert and retract the same as need be during the trimming operation. Aircraft engines are fabricated to accept trim heads at each of the necessary locations, typically being provided with a boss on which the same may be mounted in proximate engagement with a trim screw. Advantageously, the same locations are utilized herein.

With transducers installed to generate signals indicative of parameters not otherwise shown within the cockpit and with trim motors mounted, the operator is ready to initiate a trim procedure, best considered with reference to the figures of drawing. A controller unit 10 within the cockpit communicates with the engine via either the craft's harness or via external wiring laid out for this purpose. In either event, a multiplexer unit 12 as shown in FIG. 2 provides selective communication between the transducers and trim motors and the controller unit 10 within the cockpit area. In this vein, the multiplexer 12, which preferentially is mounted interiorly of the engine cowling, interfaces the circuitry of controller 10 with first and second transducers 14 and 16 for generating signals representative of the physical configuration of engine vane and bleed control and intercompressor bleed members, respectively.

The engine vane and bleed control or "EVBC" transducer 14 determines the position of the engine vane control which, in turn, senses airflow through the high pressure compressor. It is there that variable stator components are located, typically the inlet guide vanes and the fifth through seventh stage stators. These are positioned by mechanical mechanisms consisting of an actuator, a bellcrank, tie rods, and unison rings. Correct vane position for any given operation is determined by the engine vane control which schedules the position of the variable vanes as a function of the pressure ratio within the engine. In response to changes in this pressure ratio, the engine vane control directs hydraulic pressure to one end or the other of the stator vane actuator, operating sequentially the bellcrank assembly to rotate it as directed by hydraulic pressure. The variable guide vanes travel some 40° or more between closed and open stops in order to control airflow through the high pressure compressor, in some instances being devoted for purposes of trim as an angle known as the beta angle measured between the variable inlet guide vane and its aerodynamic design reference. For one conventional type of engine, the vanes remain positioned against the closed stop over approximately the first 40% of high pressure compressor power while the vanes are maintained against the open stop as power therein approaches 100% (usually about 90% or greater power). Over the intervening approximately 50% of high end power of the high pressure compressor, the vanes modulate airflow in a linear manner. Hence, determining the two end points (the closed and opened stop points) allows linear extrapolation for trimming this parameter. Transducer 14 is mounted in mechanical engagement with the engine to generate a voltage signal indicative of the stator vane positioning for that purpose.

In much the same manner, the bleed valve which diverts compressor air between the two compressors operates as a function of part engine power. In one exemplary setting, the bleed valve is controlled by a piston and is normally open from about zero to about 85% of the high pressure compressor power (to divert excess flow) while it is closed above that level. The transducer 16 is mounted in mechanically operative engagement with the control piston or some other similar ancillary structure in order to sense the position of the piston and, in turn, the condition of the bleed valve (either open or closed). A signal representative of that position is returned to the controller unit via multiplexer 12.

These signals representative of EVBC and bleed will vary from engine to engine in an absolute sense. And, this is true not only among different engine models of a given manufacturer, but even between different engines within the same model line. Accordingly, an initial procedure of the instant method calls for calibration of the system with reference to these variations between engines. With the transducers installed, and cables providing communication between the controller 10 and an engine, the operator initializes the system via a power switch 18 on the controller unit 10. A master reset switch 20 is also provided to normalize all internal circuitry. For the embodiment illustrated in the figures of drawing, the controller 10 is destined for trimming two aircraft engines via separate electrical wiring associated with the controller via input jacks 22 and 24 (hence, the indication in the figure of two channels). In the event it were desired to provide the capability of trimming three or four (or indeed more) engines, additional inputs could equally well be included. Regardless, since plural engines are involved in this exemplary discussion, there are included a right engine switch 26 and a left engine switch 28 to establish initially which engine will be trimmed in which order. Furthermore, versatility is improved by programming the internal circuitry for trimming different engine models as may be encountered for several different aircraft, including several different models for a given manufacturer and/or several different manufacturers. Along these lines, an engine-type switch 30 is provided for the operator to select the particular model engine to be trimmed in a given situation.

The necessary data storage, means for data manipulation, dedicated memory in respect of different engine models and related parameters for each, ambient weather information, and the like, as well as needed processing control are provided in controller 10 by means of a microprocessor 32, such as an 8085 microprocessor, in concert with a random access memory (RAM) 34 and first and second erasable programmable read only memories (EPROMS) 36 and 38, the latter being an electronically erasable PROM or EEPROM. The EPROM 36 provides and constitutes the executive software (or firmware) of the system while microprocessor 32 is devoted to data processing in concert therewith. RAM 34 lends temporary storage capability to the system, operating in conjunction with microprocessor 32 for the manipulation of data, suitably processed in accordance with weather-normalizing information. EEPROM 38 maintains an available memory for calibration data to be inputted from the transducers 14 and 16 via multiplexer 12; which data is maintained within the memory of EEPROM 38 until new data concerning a different trimming procedure is routed thereto. In this way calibration data may be entered for a given aircraft and maintained in place in the event the trimming operation must be terminated due to, for example, change in wind velocity or direction. That calibration procedure is best considered with reference to FIG. 3A.

Having selected the engine type and also the specific engine (e.g., left or right) to be trimmed, the operator thence depresses a calibrate switch 40 on the controller 10. Preferably, these switches include a small light emitting diode (LED) which will illuminate or flash or give other visual indication of the current status of the controller 10. Furthermore, there is preferably included a display 42 presenting alphanumeric information for the operator's visual observation, in this instance indicating that a calibrate procedure is selected. (It will be appreciated, parenthetically, that the controller 10 may equally well be fabricated to employ a touch sensitive overlay as opposed to discrete switches, visual display, etc. in order to provide operator interaction with the system.) The operator is then presented with an option to calibrate the engine vane and bleed control or the intercompressor airflow bleed, alternately elected upon momentary depression of a first switch for EVBC, identified as 44 or a second switch for airflow bleed identified as 46. Depending upon the switch depressed momentarily for that purpose, the executive software of the system will cause the microprocessor and associated circuitry to initialize for calibration as outlined generally in the flow diagram of FIG. 3A. For the sake of description, let it be assumed that EVBC is the parameter of initial interest.

Having pressed the EVBC switch 44, the operator will instruct a member of the ground crew to rotate the vanes of the engine manually to rest against the closed stop, this representing a minimum EVBC position. Insofar as the engine is not up to power and lacks hydraulic pressure, a rig pin is preferably inserted to insure that there is no creep against the hydraulic actuators. With the vanes rigged in that fashion, the operator again depresses the EVBC button to read a voltage from transducer 14 indicative of minimum EVBC; the controller being programmed to recognize the depression of that switch at that juncture of the procedure as indicative of minimum EVBC and thus awaiting introduction of that data to the EEPROM. That voltage, an analog signal, is routed via the multiplexer 12 to an analog-to-digital converter 48 ("A/D"). The analog signal is digitized and delivered to the system bus from the A/D converter 48 for storage in EEPROM 38 at an address determined for minimum EVBC. With that measurement made, the vanes are manually manipulated to the open stop and once again pinned against any creep in the hydraulic system. The controller remains ready, awaiting input of the maximum EVBC data and, with a momentary depression of the switch 44, that reading is likewise inputted to the EEPROM 38; developed first as an analog signal via the transducer 14 and sequentially digitized in A/D converter 48.

Looking briefly to the block diagram of FIG. 2, the data coming from multiplexer 12 is delivered to the A/D converter via a protector circuit 50 generally mandated by safety considerations to preclude a situation where a spark may develop in the engine atmosphere. Such protector circuits are generally commonplace and act much in the manner of a fuse, except here with regard to both current and voltage. More specifically, if the combined current and voltage delivered to a component within the engine environment exceeds whatever threshold is set within the protector, it will interrupt the signal path to prevent the potential for a sparking situation. The threshold in this case is set with regard to a reference voltage source 52. The A/D converter 48 is also operated in conjunction with a digital-to-analog converter 54 ("D/A") which is included to normalize information in the event of power fluctuations. For example, should the voltage delivered to the transducers via source 56 vary, the digitized information indicative of the condition existing within the engine is likewise shifted a proportional amount by means of D/A converter 54 so that the information ultimately routed to memory in EEPROM 38 for subsequent trimming is ratioed properly for correlation with fluctuations in supply voltage.

In any of these events, EEPROM 38 receives digitized data indicative of the minimum and maximum vane position for the variable stator vanes of the engine being trimmed. For the sake of convenience, it is highly preferable to correlate the electrical signal developed at transducer 14 with the type of information with which technicians are familiar by way of published engine manufacturer's specifications. Thus the software preferably normalizes whatever voltage is actually developed to correlate it with engine specifications set forth by the manufacturer. For example, it may be that a minimum engine vane angle (i.e., the so-called beta angle) is about minus 36° while the maximum engine vane angle may be on the order of about 6°. Recalling that the modulating range for these vanes is roughly linear between end points, this variation in angular displacement may be divided in even increments over the approximately 42° of travel between voltage end points as well allowing the visual display to read out in degrees.

Figure 3A:
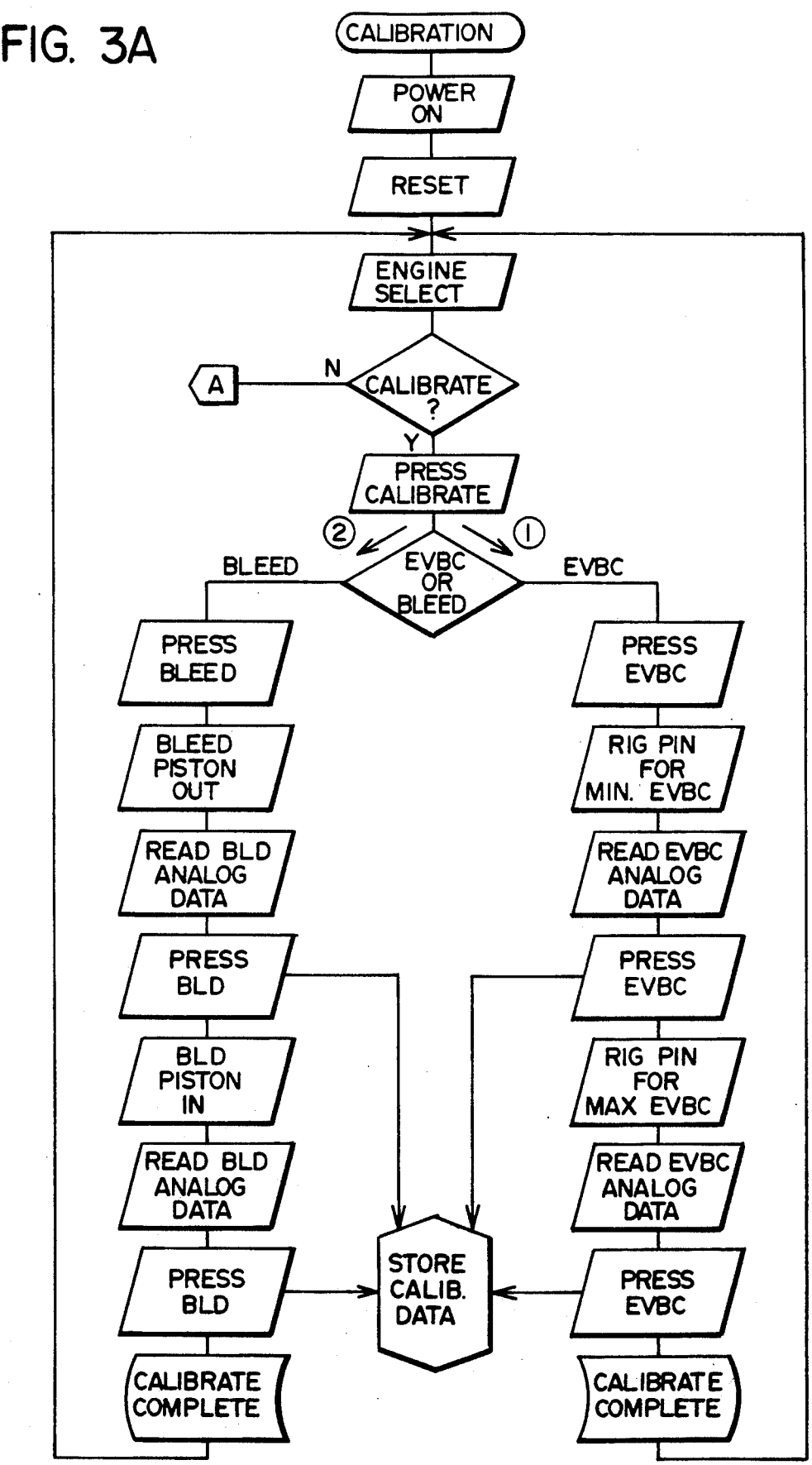

Engine vane and bleed control calibration procedures being complete, that data is stored and the system returns to an option for calibration of intercompressor airflow bleed, as best seen with reference to the logic diagram of FIG. 3A. Not all manufactures require this type of trim adjustment, but it is sufficiently commonplace that provisions are made within the instant engine trim control unit for that purpose. The calibration proceeds much the same as with the case of engine vane and bleed control, with analog signals being digitized and stored. More specifically, the piston controlling the bleed control valve is manually forced to an "out" or "open" position. With the piston in that condition, the operator within the craft depresses momentarily the bleed switch to interrogate the transducer 16. The transducer returns an analog signal to the A/D converter 48 indicative of the position of the piston. With that concluded the system awaits receipt of data in respect of the "closed" or "in" position of the piston. Thus, the ground technician manually closes the piston and the operator within the cockpit depresses the bleed switch once again to input data correlative to that position to the EEPROM 38. In this regard, it is also desirable to normalize that information to a scale correlated to engine manufacturer specifications. For example, the travel of the piston controlling the bleed valve may correspond to about 1.886 inches for a given type of engine in the open configuration versus a zero point for the closed configuration. The software associated with controller 10 may easily normalize whatever signal is developed via transducer 16 to correspond identically to this normal range seen by technicians allowing the visual display to read out in units of inches in order to avoid any confusion on the part of the operator due to departure in the manner in which trim has historically been achieved.

Figure 3B:
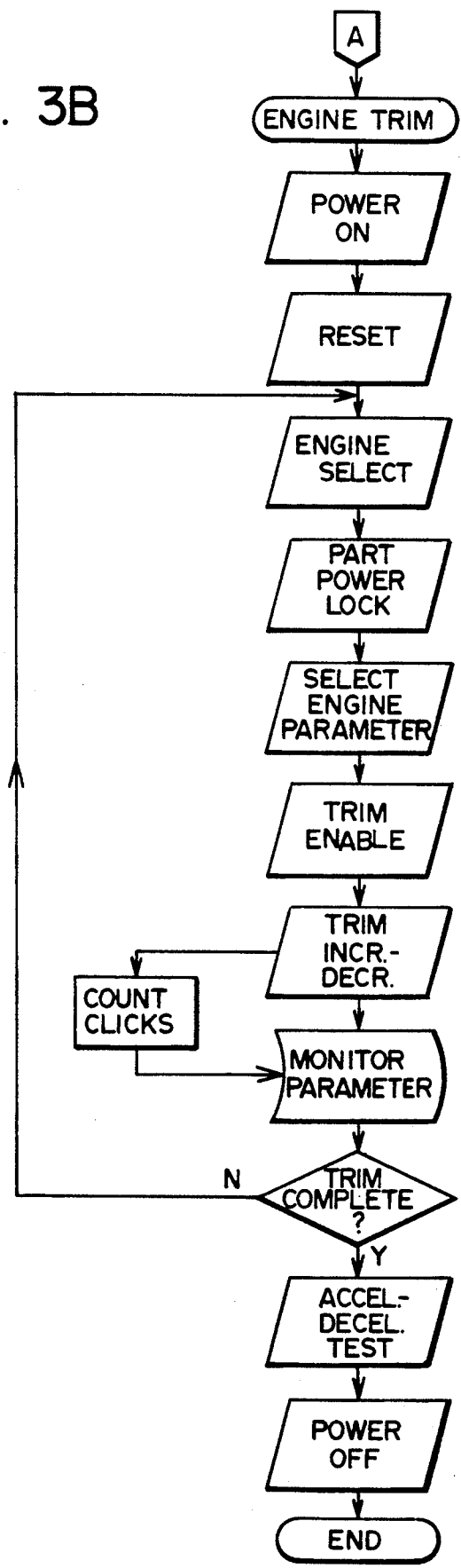

Calibration data is stored in EEPROM 38 and maintained therein until new data is inputted at some later time. Thus, controller 10 may be deenergized or even removed from the system without loss of calibration data for the engine or engines of interest. This may prove convenient, for example, where calibration data is derived for four engines of a given craft by sequential, repetitive inputting of data for each such engine in the manner aforesaid while the actual trimming operation for that craft may not be done until another day or during another work shift by a different crew. Regardless, when the actual trimming operation is to occur, the system shifts to the logic outlined in FIG. 3B upon operator command to trim engine parameters.

Once again, the operator is required to establish which of several engines is to be trimmed initially. Accordingly, either the left or right engine in the embodiment illustrated herein will be elected by momentary depression of either of switches 26 or 28 for that purpose, as will the engine type be selected via switch 30. With the selections made, the system is now ready to achieve active trimming of the engine.

In the event the trim adjustment to be made requires the same to be measured and achieved at less than full power, the operator will depress a switch identified as "PPL" for part power lock; in this instance switches 58 and 60 for inserting a part power lock pin and retracting the part power lock pin, respectively. The depression of one or the other of these switches cycles the multiplexer 12, by means of multiplexer selector circuitry 62, to apply a voltage to a motor 64. That motor, preferably a samarium cobalt motor as noted above, has its output shaft in mechanical communication with the part power lock pin of the aircraft engine so that rotation in a first direction causes the pin to be disposed within the path of the power lever of the fuel control unit of the engine while counterrotation removes the pin therefrom.

The EVBC adjustment is made by depressing the EVBC switch 44. Insofar as the controller 10 is within the trim adjustment phase, it will recognize that the depression of switch 44 is meant to initiate the trim of that parameter. A suitable legend will appear on the display 42 indicating to the operator the current condition of the vanes of the engine being trimmed. For the given temperature-day of interest, as measured against the calibration data and ambient information stored within the controller unit, it may be that the engine vane angle must be increased or decreased in order to bring the same into conformity with manufacturer's specifications. First and second trim switches 66 and 68 are provided on the controller unit to decrease and increase, respectively, the parameter of current interest, here the vane or beta angle of the variable stators. For safety sake, the system optionally but preferably requires the operator to depress the EVBC switch 44 simultaneously with either the increase or decrease switch to generate the proper signal which is applied to the multiplexer 12. That signal is then routed to a motor 70 having its output shaft associated via a planetary gear train with the EVBC trim screw of the engine. As noted in general above, a microswitch is also associated with the output of motor 70 to correlate its angular motion to the routine specifications concerning the number of "clicks" which the trim screw must be turned to achieve the desired results. This information from the microswitch is preferably time-shared through the system hard wiring for presentation on display 42. For example, let it be assumed that the engine vane angle must be adjusted to increase it and that the manufacturer's specification indicates a clockwise manipulation of the trim screw by eight clicks. The operator would then press EVBC switch 44 simultaneously with increase trim switch 68 in order to energize the motor 70. As that motor turns the microswitch associated with it will open and close to replicate "clicks", an indication of which appears on display 42 for operator observation.

With EVBC trim complete, the system then presents the operator with the next trim option. For the sake of exemplification, let it be assumed that intercompressor bleed is next required. At that juncture, the operator will depress the bleed switch 46 and then multiplexer 12 will be cycled to the bleed position. Bleed data will be presented, calibration data employed internally to determine whether or not the bleed piston requires trimming, and the operator given the opportunity to make an increase or decrease in bleed trim by means of the appropriate switches 66 and 68 in the same fashion as aforesaid. Thus, assuming that a decrease in piston position is required in order to trim the system within manufacturer's specifications, the operator will depress both switch 46 for bleed control and switch 66 for a decrease in the position of that piston. That will be translated to a voltage signal applied to the bleed motor 72 causing it to rotate and, in turn, adjust the bleed trim screw. And, like the motor for the EVBC trim, a microswitch is utilized to transmit time-shared information for presentation on display 42 corresponding to the "clicks" suggested by the engine manufacturer to achieve a given adjustment in that direction.

The next trim adjustment of interest is takeoff power. The controller awaits the operator's instruction for this phase of the procedure, indicated by depression of the takeoff switch 74; cycling the multiplexer 12 via multiplexer selector 62 to bring the takeoff trim motor 76 into electrical communication with controller 10. Once again, depressing the increase or decrease trim switch in combination with depression of the takeoff switch 74 will effectuate either rotation or counterrotation of motor 76 to achieve the appropriate trim. This is similarly coordinated with the part power lock being in or out as required by the particular engine and manufacturer's recommended procedure.

Following takeoff adjustment, approach idle and minimum idle are trimmed in virtually the same manner as outlined above. Suffice it to say that switches 78 and 80 allow the operator to elect approach idle or minimum idle, respectively and sequentially, for adjustment.

In turn, motors 82 and 84 in communication with trim screws for adjustment of approach idle and minimum idle, respectively, are provided for selective communication with the controller via the multiplexer 12. And, once again, depression of the appropriate trim switch to increase or decrease the idle achieves the desired trim result. And still further once again, microswitches may be associated with these motors to provide a visual indication of the number of "clicks" to correlate adjustment with the manufacturer's published data should that be desirable; although this is lesser concern respecting idle rpm adjustment.

Once these various engine parameters have been trimmed, it is oftentimes desirable and sometimes mandatory to test the engine for acceleration characteristics. This procedure measures the time delay from minimum idle to full power. It is determined from the cockpit by moving the thrust lever rapidly to full throttle in synchronization with a lapsed time indicator. Thus, the controller 10 includes an acceleration switch 86 for presenting a lapsed time indication on display 42. The operator simply depresses the switch 86 simultaneously with advancement of the throttle lever and, while monitoring the speed of the high pressure compressor on cockpit instrumentation determines the time over which the engine responds to achieve a predetermined rpm.

The foregoing procedures typically constitute the range of a conventional trimming operation. The calibration aspects are conducted in the absence of engine power and with the assistance of ground personnel for physical manipulation of the appropriate structurally variable engine components necessary to achieve that facet of the operation. Thereafter, with calibration data for all engines stored within the unit, engines are powered up and measurements made and trim operations performed as need be at low power, high power, and/or part power settings. Other aspects of trim which are not directly a part of the present invention but which are facilitated greatly by its use include the measurement of throttle spacing ("knob stagger") which must be examined periodically for multiengine aircraft. For example, it is less than desirable and potentially hazardous for the throttle controlling an engine on the port wing to be at a given position in order to establish a desired power level while the throttle controlling the engine on the starboard wing is staggered substantially in a physical sense from the other throttle in order for that engine to exhibit the same performance. Thus, as the technician trims the engines on multiengine craft via the unit of the present invention, the remote nature of trim while manipulating the throttle levers materially simplifies that aspect of the overall procedure. In cases where knob stagger is beyond the desirable limit, the technician is then aware that one or more of the fuel control units must be replaced to bring the throttle levers into physical conformity.

While the invention has now been described with reference to certain preferred embodiments and suggested implementations in respects thereto, those skilled in the art will appreciate that various modifications, changes, omissions, and substitutions may be made without departing from the spirit thereof. For example, the present invention has been exemplified with respect to the trimming of five particular engine parameters, three of which may be monitored via normal cockpit instrumentation while the remainder require independent sensors for developing monitor signals. Depending on the type of craft involved, more or fewer engine parameters may be displayed on cockpit instrumentation. Those that are not displayed requires engine-mounted transducers or the like (as provided herein) for that function. Then too, this may well be dictated by the ability to provide hardwiring at the time of craft manufacture versus the option of providing external cable members to the engines from the cockpit area. Such may be an option where, for example, the system is implemented with a craft not otherwise having been fitted with internal wiring specifically for that purpose or where that wiring is purposely omitted in order to achieve weight savings. Similarly, the trim heads and transducers, along with the multiplexer, are preferably associated with the engine only for so long as the trimming procedure is undertaken. Following that, these components are normally removed in order to reduce the weight of the craft since they are not normal flight equipment and would typically be rendered inoperable during flight. However, with the miniaturized components used in the present system as described above, only a few pounds would be added by maintaining a fixed or permanent mounting of these elements; a weight penalty which may well be an acceptable one under many circumstances. Furthermore, should that approach be the most preferable, the entire engine trim control unit may be built within the craft as an integral component thereof; the system then including the keyboard of the controller positioned in a convenient place in the cockpit, hard wired through the craft's harness to the engines, with the necessary transducers and trim heads maintained in place in electrical communication via the multiplexer within the engine cowling. With all manner and variety of options thus envisioned within the scope of the present invention, it is intended that the foregoing description be deemed exemplary only and not limitative on the scope of the claims granted herein.

I claim:

1. An aircraft engine repair control system for use in an engine repair environment for obtaining operating measurements of engine performance and for coordinating the position of at least one component of the aircraft engine which is not adjustable by engine controls typically mounting in the cockpit, such as engine guide vane position, engine bleed valve position and engine operating speed, with respect to selected engine power settings, said control system comprising:
   a. transducer means in operative engagement with said engine component for obtaining said operating measurements and for generating a first signal output indicative of said measurements;
   b. a portable unit which is adapted for use in a repair environment at a first repair location which is remotely located from said engine component, and which includes
      1) computer means responsive to said first signal output and adapted to generate an informational signal output representative of said engine operating measurements;
      2) display means responsive to said informational signal output and adapted to generate an alpha-numerical display of said operating measurements, and
      3) engine component position control means including input means adapted for providing a manual input at said test set in response to said visual display of said operating measurements in a manner to generate a command signal for adjusting the position of said engine component so that said operating measurement is adjusted within a selected range;
   c. motor means, including a positioning motor, and cable means which is in communication with said test unit and said positioning motor in a manner to conduct said command signal to said motor, said positioning motor being operatively connected to said engine component and being responsive to said command signal to selectively vary the position of said engine component in accordance with said manual input.
   d. said display means being arranged to generate a visual display of said operational characteristics measurement which corresponds to the components position as the component position is selectively varied;
   e. said first repair location being a cockpit area of said aircraft;
   f. said computer means, said display means and said control means comprise a portable test unit adapted to be realeasably operatively connected to said transducer means and said motor means;
   g. said motor means being operatively connected to screw means adapted for rotational movement to adjust the position of said engine component;
   h. said computer means including a calibration mode for receiving minimum and maximum output values representative of travel end points of movement of at least one of said engine components when said engine component is moved between locations corresponding to said minimum and maximum values; and
   i. said system additionally comprising engine component position locking means for restricting movement of said engine component in response to an entry at said input means after said component has been moved to a preselected location for measuring said operational characteristics.

2. The engine trim control system of claim 1, further comprising keyboard means on said unit for operator interactive control of said unit.

3. The engine trim control system of claim 1, wherein said motor means comprises an engine mountable, rare earth-cobalt brushless DC motor.

4. The engine trim control system of claim 1, further comprising microswitch means in operative engagement with said motor means for opening and closing as said motor turns.

5. The engine trim control system of claim 1, wherein said computer means includes micro-processor means for processing electronically entered trim data signals in operating communication with first PROM means for receiving and storing system control instructions and second PROM means for receiving and storing calibration data in respect of said variable engine components, RAM means for temporary data storage and transfer, and digital converter means for digitizing analog signals from said engine components.

* * * * *